United States Patent Office
3,652,675
Patented Mar. 28, 1972

3,652,675
2-METHOXY-5-HYDROXYBENZALDEHYDE
Durvasula V. Rao, Hamden, and Henri Ulrich, Northford, Conn., assignors to The Upjohn Company, Kalamazoo, Mich.
No Drawing. Filed June 22, 1970, Ser. No. 48,519
Int. Cl. C07c 47/56
U.S. Cl. 260—600     1 Claim

ABSTRACT OF THE DISCLOSURE

The novel compound, 2-methoxy-5-hydroxybenzaldehyde is disclosed. This compound is distinguished from its known isomers by its capability of forming photochromic polyspirans via conversion to its O-acrylate, polymerization of the latter, demethylation of the original 2-methoxy group and condensation of the resulting poly(salicylaldehyde) derivative with 2-methylene-1,3,3-trimethylindoline. 2-methoxy-5-hydroxybenzaldehyde is obtained by selective demethylation of 2,5-dimethoxybenzaldehyde using sulfuric acid.

BACKGROUND OF THE INVENTION (1) Field of the invention

The invention relates to a novel compound and derivatives thereof, and is more particularly concerned with a novel aromatic aldehyde, with a process for its preparation, with processes for its conversion to novel polymers, and with the novel polymers so obtained.

(2) Description of the prior art

A number of benzaldehydes which are substituted by both a hydroxy group and a methoxy group are known in the art. These include 2-methoxy-4-hydroxybenzaldehyde, 2-methoxy - 6 - hydroxybenzaldehyde, 3-methoxy-4-hydroxybenzaldehyde (vanillin), 3-methoxy-5-hydroxybenzaldehyde, 3-methoxy-6-hydroxybenzaldehyde, 2-hydroxy-3-methoxybenzaldehyde (o-vanillin), 2-hydroxy-4-methoxybenzaldehyde, and 3-hydroxy-4-methoxybenzaldehyde (isovanillin).

We have now found that 2-methoxy-5-hydroxybenzaldehyde, a hitherto undescribed isomer of the above compounds, is possessed of uniquely valuable properties which are described hereinafter and which are not possessed by any of the above-named compounds. We have found further that said 2-methoxy-5-hydroxybenzaldehyde can be employed as the starting material in the preparation of photochromic polymers having highly useful properties.

SUMMARY OF THE INVENTION

This invention comprises the compound 2-methoxy-5-hydroxybenzaldehyde which is characterized by the formula:

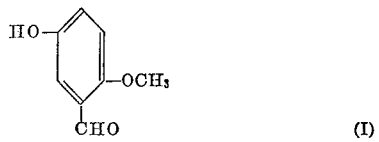

(I)

This invention also comprises certain novel photochromic polymers which can be prepared from the above compound by methods which will be described hereinafter.

DETAILED DESCRIPTION OF THE INVENTION

The novel 2-methoxy-5-hydroxybenzaldehyde (I) of the invention is prepared conveniently by selective dealkylation of the corresponding 2,5-dimethoxybenzaldehyde. The latter is a compound well-known in the art; see, for example, Dictionary of Organic Compounds, vol. 2, page 1053, fourth edition 1965, Oxford University Press. The selective demethylation of 2,5-dimethoxybenzaldehyde to 2-methoxy-5-hydroxybenzaldehyde can be effected readily using mineral acid, preferably sulfuric acid, as the dealkylating agent. The demethylation is advantageously carried out by bringing the dimethoxybenzaldehyde and mineral acid together and maintaining the mixture at a temperature within the range of about 45° C. to about 65° C. and preferably within the range of about 50° C. to about 55° C. The progress of the reaction can be followed by routine analytical procedures, for example by observing the appearance of infrared absorption bands corresponding to the free hydroxyl group liberated in the dealkylation.

The desired 2-methoxy-5-hydroxybenzaldehyde (I) is isolated from the reaction product using conventional procedures. For example, the excess mineral acid is neutralized and the product (I) is converted to its soluble salt by addition of an excess of alkali. Any unchanged dimethoxybenzaldehyde is extracted from the reaction product by solvent extraction and the desired product (I) is precipitated from the aqueous layer by acidification. The product so obtained is solid and is readily isolated by filtration, centrifugation and the like. Purification can be accomplished by recrystallization, chromatography and like methods.

It is to be noted that the above dealkylation procedure effects dealkylation selectively at the 5-methoxy and the resulting product is substantially free from contamination with any 2-hydroxy-5-methoxybenzaldehyde produced by dealkylation at the 2-methoxy. Other dealkylation methods, e.g. dealkylation using Lewis acids in accordance with the procedure of Dean et al., Tetrahedron Letters, 4153, 1966, give equally selective dealkylation at the 2-methoxy and yield the undesired 2-hydroxy-5-methoxybenzaldehyde.

The 2-methoxy-5-hydroxybenzaldehyde (I) of the invention can be converted to novel photochromic polyspirans using the following reaction scheme. The compound (I) is acylated by conventional procedures to yield the corresponding O-acrylyl or O-methacrylyl derivative (III). Illustratively, the compound (I) is reacted with the appropriate acrylyl halide,

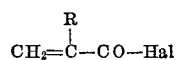

(II) wherein R represents hydrogen or methyl and Hal represents halogen, preferably conducted under the conditions of the well-known Schotten-Baumann reaction; see Berichte 17, 2544, 1884; ibid, 19, 3218, 1886. This reaction step is represented schematically as follows:

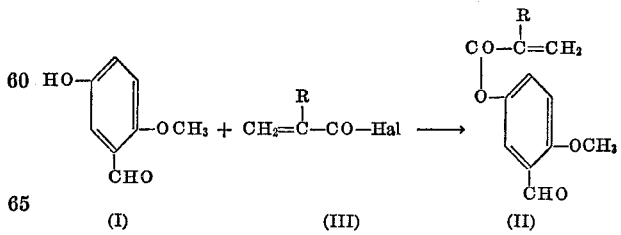

wherein R is as hereinbefore defined.

The acrylate (II) so obtained is then subjected to polymerization under conditions well-known in the art for the polymerization of vinyl monomers. Illustratively, the polymerization is conducted by admixing the monomer with a polymerization initiator and heating the resulting mixture, preferably in an inert atmosphere such as that provided by nitrogen, argon, krypton and like inert gases, at the desired polymerization temperature until the polymerization has reached the desired stage. The polymerization initiators (also referred to as free radical sources) which are employed are those conventionally used in the art such as dimethyl peroxide, 2,2'-azobis(isobutyronitrile), benzoyl peroxide, t-butyl hydroperoxide, ascaridole and the like. The temperature at which the polymerization is conducted is advantageously within the range of about 40° C. to about 135° C. depending upon the particular initiator employed. As is well-known in the art, the temperature at which any particular polymerization is carried out optimally is determined primarily by the half-life of the initiator. For example, the temperature at which polymerization is carried out is preferably within the range of about 60° C. to about 100° C. when benzoylperoxide or 2,2'-azobis(isobutyronitrile) is employed as initiator whereas higher temperatures of the order of about 135° C. are preferable using initiators such as t-butyl hydroperoxide.

The average molecular weight of the polymer so obtained is within the range of about 50,000 to about 1,000,000. The average molecular weight can be controlled by adjustment of the polymerization conditions to achieve any desired result.

The polymerization step can be represented schematically as follows:

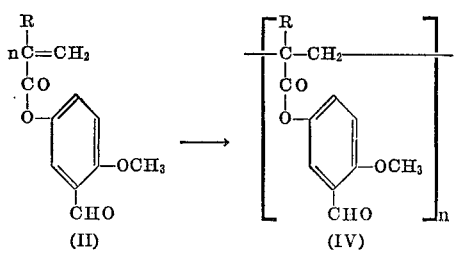

wherein R is as hereinbefore defined.

In the penultimate step of the synthesis of the photochromic polymers of the invention, the above intermediate (IV) is dealkylated in accordance with the following scheme:

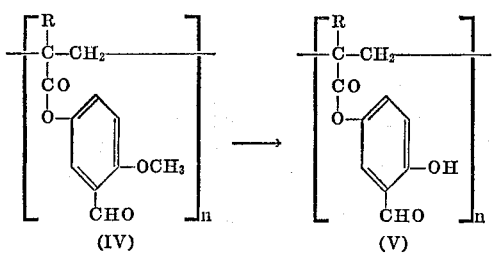

wherein R is as hereinbefore defined.

The dealkylation is accomplished readily using Lewis acids, such as boron trifluoride, as the dealkylating agents under the conditions described by Dean et al., supra.

In the final stage of preparation of the photochromic polymers of the invention, the polymer (V) having a free hydroxy group in the position ortho to the aldehyde group in the recurring benzene nucleus, is condensed with the appropriate 2 - methylene - 1,3,3 - trimethylindoline (VI) in accordance with the following reaction scheme:

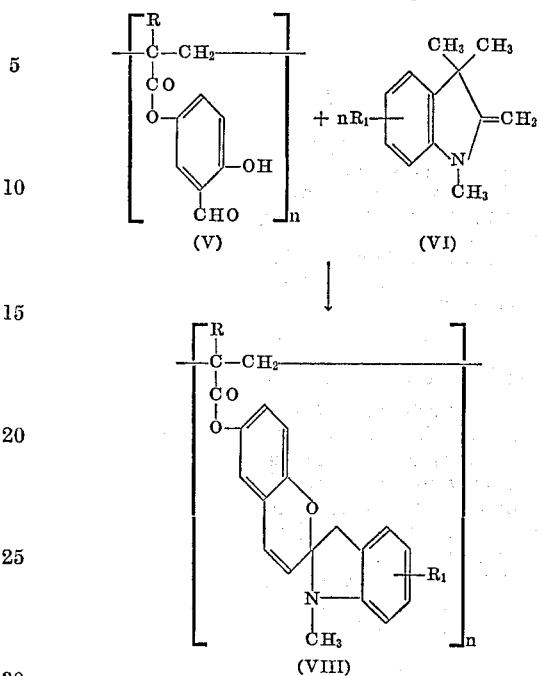

wherein R is as hereinbefore defined and $R_1$ represents from 0 to 4 substituents selected from the class consisting of alkyl, alkoxy, alkylthio, halogen, and nitro. Alkyl preferably contains 1 to 6 carbon atoms and is inclusive of methyl, ethyl, propyl, butyl, pentyl, hexyl and isomeric forms thereof. Alkoxy preferably contains from 1 to 6 carbon atoms and is inclusive of methoxy, ethoxy, propoxy, butoxy, pentyloxy, hexyloxy and isomeric forms thereof. Alkylthio preferably contains from 1 to 6 carbon atoms and is inclusive of methylthio, ethylthio, propylthio, butylthio, pentylthio, hexylthio and isomeric forms thereof.

The condensation of the methyleneindoline (VI) and the hydroxy aldehyde polymer (V) is effected readily by heating the reactants together in a solvent such as ethanol, tetrahydrofuran, acetone, methyl ethyl ketone, dioxane, and the like using the procedure described by, for example, Berman et al., J. Am. Chem. Soc., 81, 5605, 1959. The proportion of methyleneindoline (VI) employed in the condensation is preferably that which corresponds to at least 1 mole for each recurring hydroxyaldehyde unit in the polymer (V). The polyspiropyran (VII) so obtained can be purified, if desired, by reprecipitation from appropriate solvents, by chromatography, or by like conventional procedures.

The polyspiropyran (VII) is a photochromic polymer, i.e. it undergoes a reversible color transformation on exposure to appropriate radiation, and is useful for all purposes for which such polymers are currently employed. Illustratively, said polyspirans (VII) can be employed in the control of transmission of undesirable radiation through glass and transparent plastic. For example, the polyspiropyran (VII) can be applied as a film (e.g. by dissolving in a relatively volatile solvent and brushing or spraying on the substrate to be treated) to sunglasses, windows, automobile windshields, and other eye protecting devices to control or reduce the transmission of ultraviolet light or other undesirable radiation of the sun or other energy sources. Additionally, the polyspirans (VII) find application in memory devices for high density storage of computer data and for this purpose are applied and used in accordance with the procedures described in U.S. Pat. 2,953,454. The polyspiropyrans (VII) are also useful for all the other purposes for which photochromic substances are employed in accordance with procedures described in the art; see, for example, Kosar, Light Sensitive Systems, John Wiley and Sons, Inc., New York, 1965, pages 380–6.

The ability to form the polyspiropyrans (VII) distinguishes the novel aldehyde of the invention, namely 2-methoxy-5-hydroxybenzaldehyde (I), from all the known isomers thereof. The only other known isomer of (I) which can enter into the above described polyspiropyrans (VII) is 2-methoxy-4-hydroxybenzaldehyde. However, it is found that the polyspiropyrans derived from the latter compound are clearly inferior in properties, more particularly in the rate at which photochemical interconversion takes place to the polyspiropyrans of Formula VII of this invention.

The following examples describe the manner and process of making and using the invention and set forth the best mode contemplated by the inventors of carrying out the invention but are not to be construed as limiting.

EXAMPLE 1

2-methoxy-5-hydroxybenzaldehyde

A total of 112.5 ml. of concentrated sulfuric acid was added slowly, with stirring and cooling, to 20.75 g. (0.125 mole) of 2,5-dimethoxybenzaldehyde, maintained under an atmosphere of nitrogen. The resulting mixture was then maintained at 50 to 54° C. for 46 hours with stirring. The reaction mixture was then poured on ice and the oily mass which separated was extracted with ether. The ether extract was extracted with 200 ml. of a 5 percent aqueous sodium hydroxide solution. The alkaline extract was acidified by the addition of concentrated hydrochloric acid and the solid which separated was extracted in ether. The ethereal extract was washed with water, dried over anhydrous magnesium sulfate and evaporated to dryness. There was thus obtained 8.15 g. (42.3 percent theoretical yield) of 2-methoxy-5-hydroxybenzaldehyde which, after recrystallization from aqueous alcohol, was obtained in the form of yellow needles having a melting point of 114 to 116° C.

*Analysis.*—Calculated for $C_8H_8O_3$ (percent): C, 63.15; H, 5.30. Found (percent): C, 62.93; H, 5.31.

The structure of the compound was confirmed by infrared and nuclear magnetic resonance spectral analysis. The infrared spectrum (chloroform solution) exhibited maxima at $2.78\mu$, $2.95\mu$, $3.15\mu$, $7.90\mu$, and $9.72\mu$. The nuclear magnetic resonance spectrum (acetone) exhibited a singlet at $\delta$ 3.88 (3H, $C_2$—$OCH_3$), multiplet between $\delta$ 6.90–7.30 (3H, aromatic) and a singlet at $\delta$ 10.38 (1H, $C_1$–CHO).

A total of 4.4 g. (21.2 percent recovery) of 2,5-dimethoxybenzaldehyde was recovered from the initial ethereal extract of the reaction product.

What is claimed is:
1. 2-methoxy-5-hydroxybenzaldehyde.

No references cited.

BERNARD HELFIN, Primary Examiner

U.S. Cl. X.R.

106—288 Q; 117—33.3, 124 E, 161 VB; 260—89.5 N, 89.5 R, 479 R